May 14, 1940.　　　　　D. BEGGS　　　　　2,200,908

FUEL BURNER CONTROL SYSTEM

Filed Aug. 30, 1939　　　4 Sheets-Sheet 1

Inventor
D. Beggs

By
Charles A. Lind
Attorney

May 14, 1940.   D. BEGGS   2,200,908
FUEL BURNER CONTROL SYSTEM
Filed Aug. 30, 1939   4 Sheets-Sheet 2

Inventor
D. Beggs
By
Charles A. Lind
Attorney

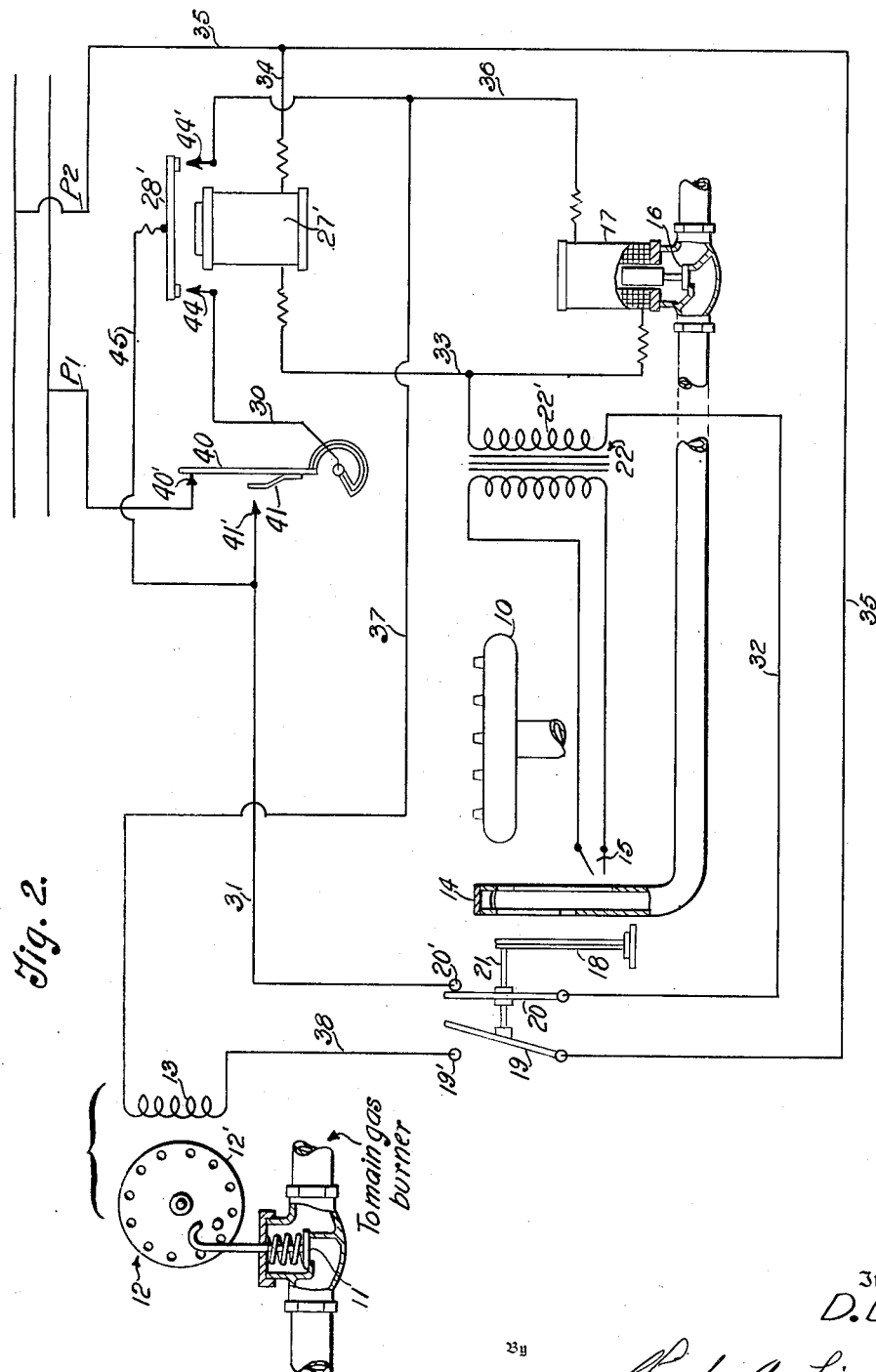

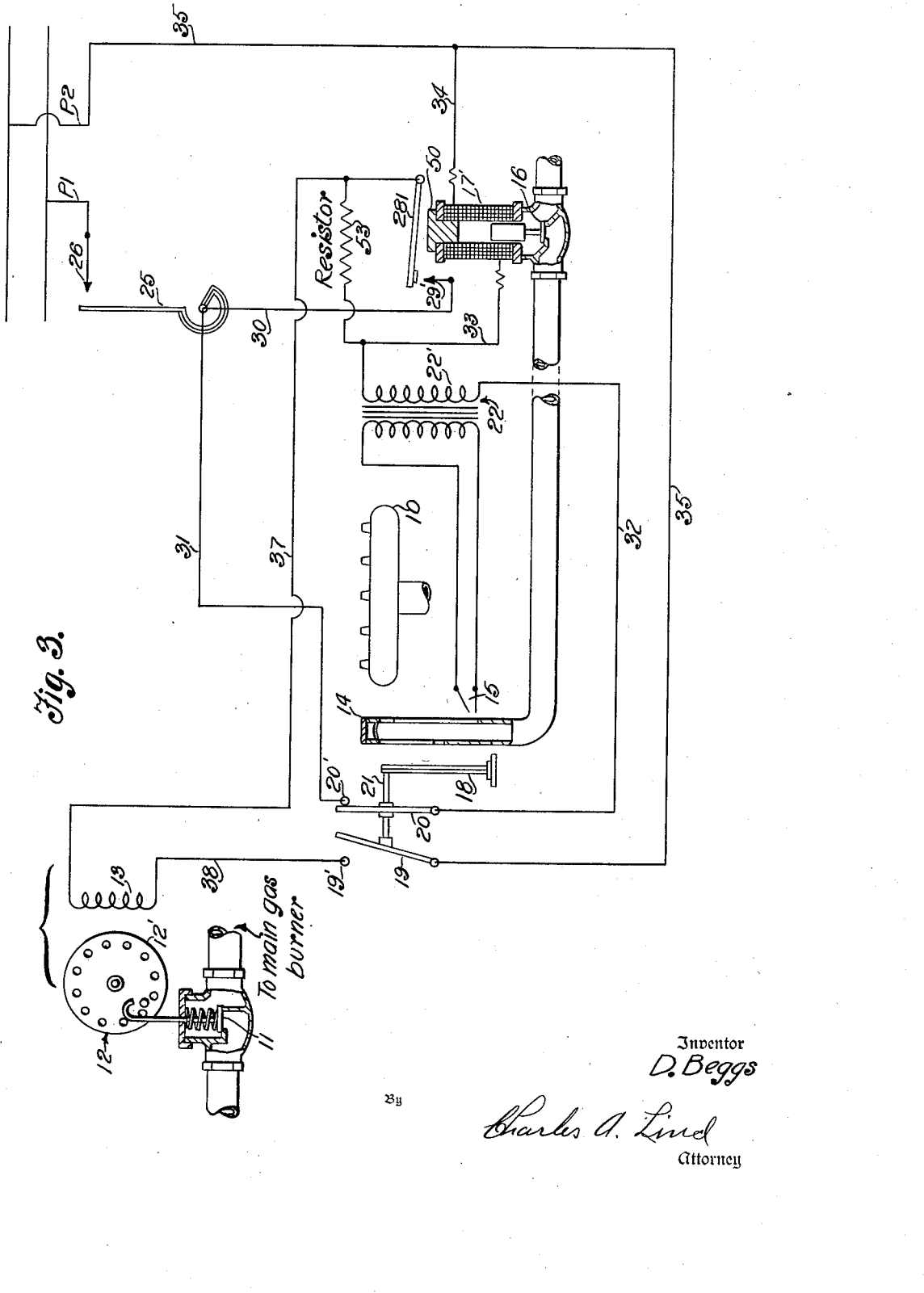

Patented May 14, 1940

2,200,908

UNITED STATES PATENT OFFICE 2,200,908

FUEL BURNER CONTROL SYSTEM

Don Beggs, Toledo, Ohio, assignor to Surface Combustion Corporation, Toledo, Ohio, a corporation of New York Application August 30, 1939, Serial No. 292,695

8 Claims. (Cl. 158—28)

The present invention has for its object to provide improvements in a burner control system wherein the flow of gas to a pilot for the main burner is shut off each time a master control switch, such as a room thermostat, operates to shut down the main burner. Known control systems of the type indicated have embodied more or less complicated control circuits and it is therefore one of the more particular objects of the invention to provide a control system which shall embody a minimum number of operating parts for effecting the desired sequence of operation. Other objects and the various features of novelty and invention will more fully appear from the detailed description taken in connection with the accompanying drawing wherein the preferred form of the invention is shown.

In the drawings:

Figs. 1 and 2 are more or less diagrammatic layouts of one and the same improved control system, the difference between the two views being that in Fig. 1 the master control switch (room thermostat) is shown as of the single contact type whereas in Fig. 2 it is shown as of the double contact type.

Fig 3 is a modification of the control circuits shown in Fig. 1, and

Figure 1:
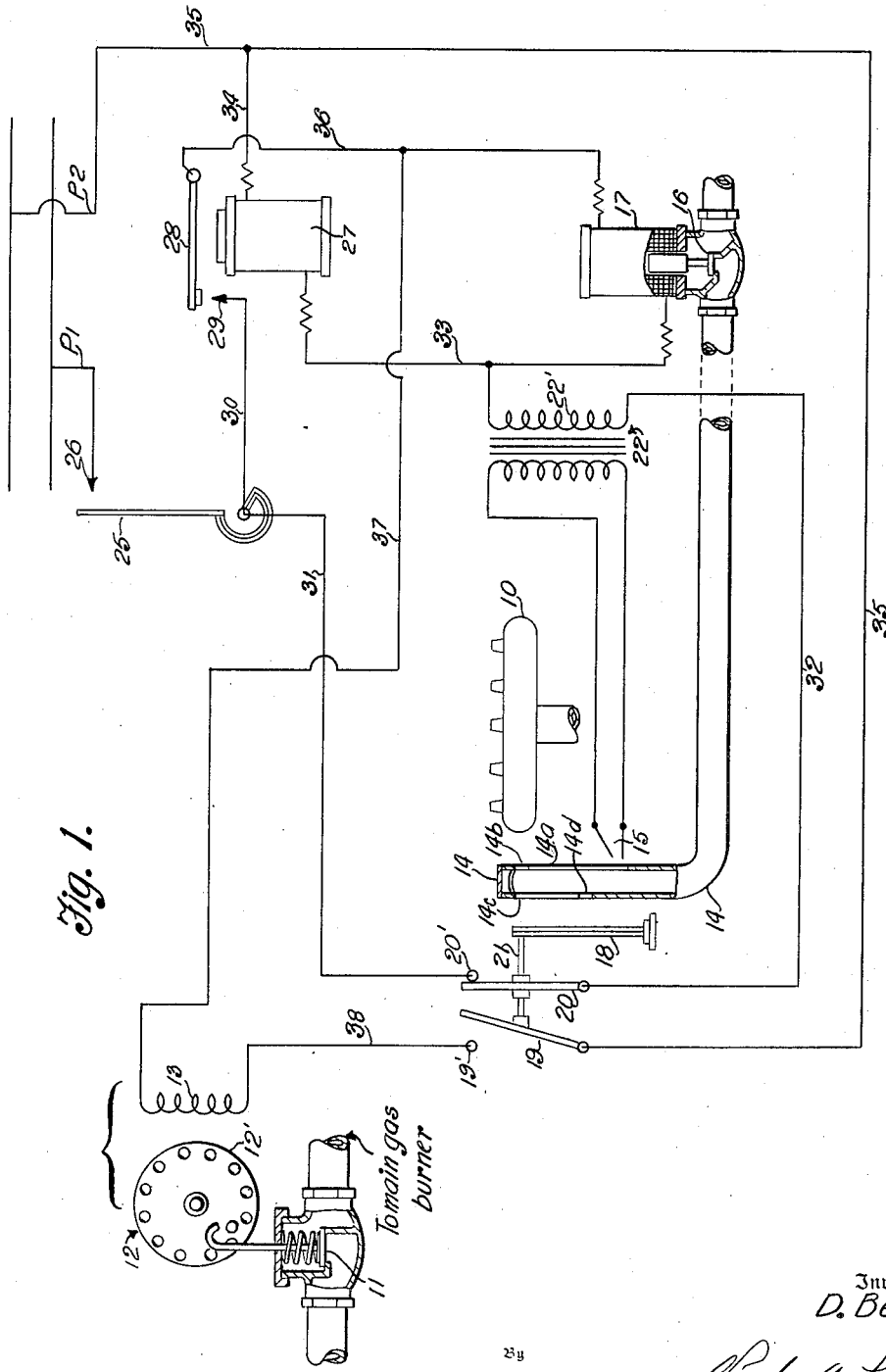

In the drawings, 10 indicates a conventional type of gas burner whose operation is to be controlled; 11 the main gas supply valve for the burner, this valve being biased to closed position, and 12 an electric motor for opening the valve, the motor being shown as comprising a rotor 12' and a winding 13. Arranged in igniting proximity to the main burner is a pilot burner 14 adapted to be lighted by any suitable electric igniter generally indicated at 15. The gas supply line to the pilot is provided with a normally closed valve 16 which is adapted to be opened by a solenoid 17. Arranged in a position to be heated by the pilot is a thermostat 18 of any preferred type, the same being shown as a bimetallic element.

The purpose of the pilot thermostat 18 is to actuate two switches 19 and 20 operatively connected to the thermostat in any suitable manner as by an operating rod 21. The contact for the switch 19 is indicated at 19' and the contact for the switch 20 at 20'. The relation of the switches 19 and 20 with respect to each other and with respect to their contacts is such that when the thermostat 18 is cold, the switch 20 will be in engagement with its contact 20' and the switch 19 will be open with respect to its contact 19'. When the pilot thermostat is hot, the situation is just the reverse, that is to say, the switch 19 will be in contact with its contact 19' and the switch 20 will be open with respect to its contact 20'. Moreover, the arrangement is such that the said switches are never both closed at one and the same time.

Although the pilot burner may be of any preferred type it is preferably of the type having a vertical orifice 14a in one of its sides for propagating flame from the igniter 15 to the upper main flame orifice 14b and having another vertical orifice 14c in its opposite side for propagating flame from the main flame orifice to the orifice 14d which faces the thermostat 18. The principal advantage of a pilot of this type is that unless the flame at the main flame orifice 14b is adequate for lighting the main burner, the gas issuing from the lower orifice 14b will not become ignited with the result that the pilot thermostat will remain cold. The electric igniter 15 is supplied with current from the secondary of a high tension ignition transformer 22, the primary of which is indicated at 22'.

Referring now more particularly to Fig. 1, 25 indicates a master switch for controlling the operation of the control system. This switch will ordinarily be a room thermostat of the single or double contact type, the single contact type being shown in Figs. 1 and 1A. When there is no call of heat, said switch is out of engagement with its contact 26 which is the terminal of the power line lead P1. 27 indicates the coil of a relay whose armature is indicated at 28. When the coil 27 is energized, the armature 28 engages with contact point 29, it being noted that the contact 29 is connected to the master switch 25 by wire 30. Note also that the master switch 25 is connected to the pilot switch contact 20' by wire 31.

The operation of the system shown in Fig. 1 is as follows:

The parts are shown in the deenergized position with the pilot thermostat 18 in the cold position. When the master switch 25 is moved to closed position, the relay coil 27 and the ignition transformer 22 are simultaneously energized by a circuit which includes the power line lead P1, thermostat contact 26, wire 31, pilot switch 20, wire 32, ignition transformer primary 22', wire 33, relay coil 27, and wire 34 to the other power line lead P2.

When the relay coil 27 is thus energized, the armature 28 moves to close the relay contact 29. The closing of this contact establishes a holding circuit for the relay coil 27, this circuit also being the energizing circuit for the pilot valve solenoid 17. This holding circuit includes the power line lead P1, thermostat contact 26, wire 30, relay contact 29, armature 28, wire 36, solenoid 17, wire 33, relay coil 27, and wire 34 to the other power line lead P2. Gas is thus free to flow to the pilot and is lighted by the spark being produced at electrodes 15.

After the pilot has been burning for a sufficient length of time to impart a predetermined amount of heat to pilot thermostat 18, the pilot switch 20 will be moved to open position with the result that the ignition transformer is deenergized. However, the relay coil 27 and pilot valve solenoid 17 remain energized by means of the holding circuit which has been previously established.

The pilot continues to burn with the result that the pilot thermostat 18 will, in due course of time, move pilot switch 19 into engagement with its contact 19'. The closing of switch 19 establishes an operating circuit for the main valve motor 12 to open the main gas valve 11. This circuit includes power line lead P1, thermostat contact 26, wire 30, relay contact 29, armature 28, wire 36, wire 37, motor winding 13, pilot switch 19 and wire 35 to the other power line lead P2. The result is that the main burner is now operating, it being remembered that the pilot is burning.

When the room thermostat or master switch 25 is opened, the flow of gas to both the pilot and main burners will automatically be shut off, and the relay will open. The pilot cannot again be put in operation until after the pilot thermostat 18 has cooled sufficiently to first open pilot switch 19 and then close pilot switch 20, it being remembered that the initial energization of the parts depends upon the closure of switch 20. For this reason, the entire apparatus must completely recycle each time the power is interrupted, either by the opening of master switch 25 or by momentary power failure.

Figure 1A:
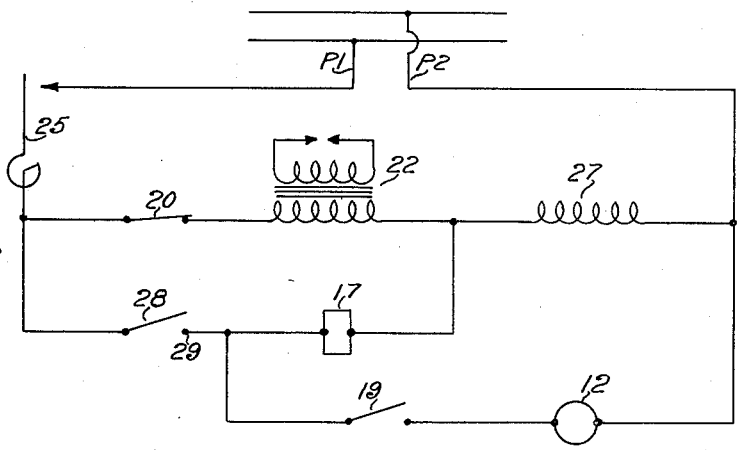
Fig. 1A, 2A and 3A are simplified electrical diagrams of the control circuits shown in Figs. 1, 2 and 3, respectively.
Figure 2A:
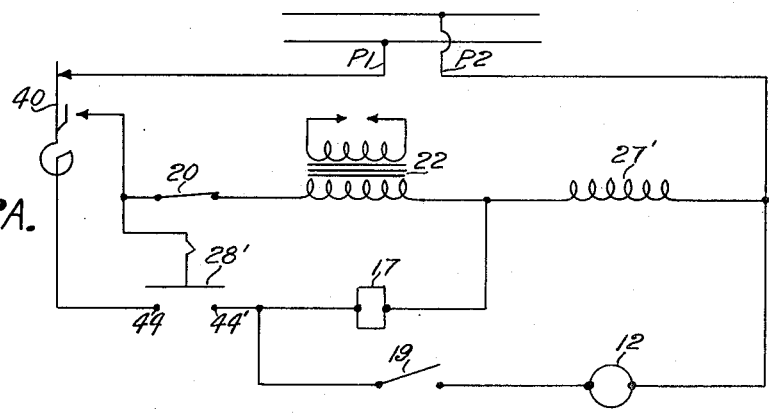

Although the system disclosed in Figs. 1 and 1A shows a single-contact room thermostat, the invention is equally well adapted to the use of a double-contact room thermostat, as will be readily understood by reference to Figs. 2 and 2A.

In Fig. 2, the double contact thermostat comprises a set of movable blades 40 and 41 which are in engageable relation with a pair of contacts 40' and 41' respectively. When the thermostat moves to call-for-heat position, the blade 40 will engage with its contact 40', the blade 41 later engaging with its contact 41'. When the thermostat moves to no-call-for-heat position, the situation is just the reverse, that is, contact 41' is first to open, the contact 40' opening later. The contact relationship is usually such that there is a 2° F. or 3° F. temperature differential between the opening or closing of respective contacts, the blade 40 being made relatively flexible to allow for differential in movement. It will be understood that in call-for-heat position, the blade 40 will be firmly engaged with contact 40' by the time that blade 41 engages with contact 41'.

27' indicates the coil of a relay whose armature is indicated at 28'. When the coil 27' is energized, the armature 28' engages with relay contacts 44 and 44'.

The operation of the arrangement shown in Fig. 2 is as follows:

The parts are shown in the deenergized position, the pilot thermostat 18 being in cold position, and contact 40' of the room thermostat 5 being closed. When the blade 41 of the room thermostat engages with its contact 41', the relay coil 27' and the ignition transformer 22 are simultaneously energized by a circuit which includes the power line lead P1, thermostat contact 40', blade 40 to blade 41, contact 41', wire 31, pilot switch 20, wire 32, ignition transformer primary 22', wire 33, relay coil 27' and wire 34 to the other power line lead P2. When the relay coil 27' is thus energized, the armature 28' moves to close relay contacts 44 and 44'.

The closing of relay contact 44 serves to transfer the power through the room thermostat directly to contact 40' and thus eliminate excessive arcing at contact 41', it being remembered that contact 40' is firmly closed, whereas contact 41' is very lightly closed. The relay and the ignition transformer are now energized by a circuit including power line P1, thermostat contact 40', wire 30, relay contact 44, armature 28', wire 45, wire 31, etc., back to the other power line lead P2. It will be noted that the apparatus is now no longer under the control of room thermostat contact 41', this contact serving only to initially energize the relay and ignition transformer.

The closing of relay contact 44' establishes a holding circuit for the relay coil 27', this circuit also being the energizing circuit for the pilot valve solenoid 17. This holding circuit includes power line lead P1, thermostat contact 40', wire 30, relay contact 44, armature 28', relay contact 44', wire 36, solenoid 17, wire 33, relay coil 27' and wire 34 to the other power line lead P2.

The pilot switches 19 and 20 are caused to be actuated in the same manner as that described in connection with Fig. 1. When the pilot thermostat 18 moves to close the pilot switch 19, an operating circuit for the main valve motor 12 is established, this circuit including power line lead P1, thermostat contact 40', wire 30, relay contact 44, armature 28', relay contact 44', wire 37, motor winding 13, wire 38, pilot switch 19, and wire 35 back to the other power line lead P2.

When blade 40 of the room thermostat disengages with contact 40', the entire apparatus is shut down and must completely recycle as will be understood.

The control arrangements thus far described have a minimum of operating parts. Of particular importance is the fact that the present invention permits the use of a relay having a very simple contact arrangement. Relay contacts are an inherent source of mechanical trouble, and it will be appreciated that the type of relay described is one that is least susceptible to contact misalignment.

There are a number of safety features worth noting. First of all, it will be remembered that the relay must be closed before gas can be admitted to the pilot burner. The relay can be initially closed only by means of a circuit which includes the ignition transformer. Thus, if the ignition transformer primary should become open-circuited, making ignition impossible, the relay cannot be initially closed, with the result that the pilot valve cannot be opened. This eliminates any explosion hazard due to unburned pilot gas.

This invention also inherently gives protection against a short circuit in the ignition transformer, which is a common source of trouble. The ignition transformer is operated in series with the relay. The pilot valve is also operated in series with the relay, and in parallel with the ignition transformer, as will be noted particularly in Figs. 1A and 2A. If the ignition transformer should become short-circuited, there will be an excessive voltage drop across the relay, with the result that the pilot valve will not receive normal voltage and thus will not open.

If the pilot switches 19 and 20 are out of normal adjustment, such as would be the case if the pilot thermostat 18 became warped so as to close switch 19 when the thermostat is cold, it is impossible to admit gas to either the pilot or main burner. As previously pointed out, whenever switch 19 is in closed position, switch 20 is always open. Inasmuch as the relay cannot be initially energized unless switch 20 is closed, the entire apparatus will be rendered non-operative if the pilot switches are out of adjustment.

In the event that there is a momentary gas failure while the main burner is operating, the main burner and pilot burner will both be extinguished. However, the pilot will automatically be relighted as soon as the pilot thermostat 18 has cooled sufficiently to close pilot switch 20, the latter serving to energize the ignition transformer. In this regard, it will be seen that the ignition transformer can never be energized while the main gas valve is open, in view of the contact relationship of the pilot switches 19 and 20.

In Fig. 3 I have shown how a combined pilot valve solenoid and relay may be used in the present control system. The relay comprises a core 50 which extends into the upper end of the pilot valve solenoid 17'. When the solenoid is energized, the core 50 attracts the armature 281 which closes the relay contact 29'. A resistor is indicated at 53. The remainder of the apparatus shown in this arrangement is the same as that described in connection with Fig. 1. The mode of operation is as follows:

When the room thermostat or master switch 25 is closed, the ignition transformer 22 and solenoid 17' are initially energized by a circuit which includes power line lead P1, master switch contact 26, wire 31, pilot switch 20, wire 32, ignition transformer primary 22', wire 33, solenoid 17' and wire 34 to the other power line lead P2.

When the solenoid 17' is energized, gas is free to flow to the pilot, and the relay contact 29' is closed. The closing of contact 29' establishes a holding circuit for the solenoid 17', this circuit including power line lead P1, contact 26, wire 30, relay contact 29', armature 281, resistor 53, wire 33, solenoid 17', and wire 34 to power line lead P2.

It will be remembered that after the pilot has been burning for a period of time, the pilot switch 19 will be moved to closed position, thus establishing an operating circuit for the main valve motor 12. This circuit includes power line lead P1, contact 26, wire 30, relay contact 29', armature 281, wire 37, motor winding 13, wire 38, pilot switch 19 and wire 35 to power line lead P2.

When the master switch contact 26 is opened, the entire apparatus is shut down and must completely recycle before gas can be again admitted to the main burner.

Figure 3A:
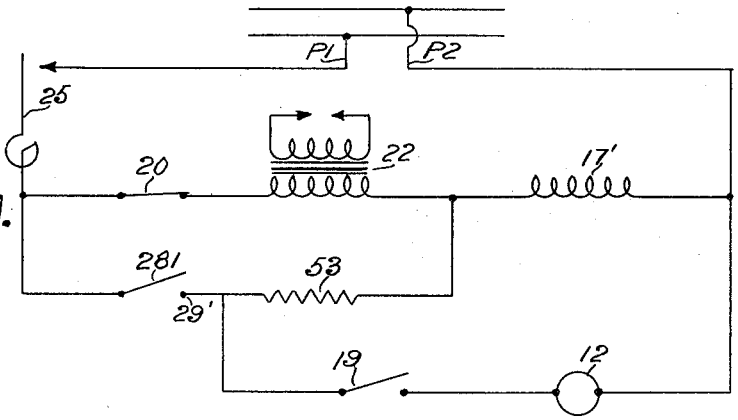

It will be noted that resistor 53 is in the holding circuit for the solenoid 17'. This resistor together with the relay switch serve as a shunt circuit across the ignition transformer 22 and pilot switch 20 so that the solenoid 17' will remain energized after the ignition transformer has been deenergized by the opening of switch 20. Fig. 3A clearly shows this relationship. Obviously, since the ignition transformer is shunted by the resistor, the latter should have a sufficiently high resistance to permit a substantial part of the current through solenoid 17' to flow through the ignition transformer. In Figs. 1A and 2A, the solenoid 17 serves the same shunting purpose as the resistor in Fig. 3A, as will be appreciated.

What is claimed is:

1. In apparatus of the class described, the combination of a pilot burner, a pilot burner valve, an electric motor for opening said valve, an electric igniter for said burner, a control relay having a normally open switch, a master control switch, an energizing circuit for the relay independent of the pilot valve motor and including said master control switch and igniter, a holding circuit for the relay independent of the igniter and including said master control switch, the relay switch and the pilot valve motor.

2. In apparatus of the class described, the combination of a pilot burner, a pilot burner valve, an electric motor for opening said valve, an electric igniter for said burner, a control relay having a normally open switch, a master control switch, an energizing circuit for the relay independent of the pilot valve motor and including said master control switch and igniter, a holding circuit for the relay independent of the igniter and including said master control switch, the relay switch and the pilot valve motor, a normally closed switch in said energizing circuit, and means dependent on flame at the pilot for opening the last named switch whereby to deenergize the igniter.

3. In apparatus of the class described, the combination of a pilot burner, a pilot burner valve, an electric motor for opening said valve, an electric igniter for said burner, a control relay having a normally open switch, a master control switch, an energizing circuit for the relay independent of the pilot valve motor and including said master control switch and igniter, a holding circuit for the relay independent of the igniter and including said master control switch, the relay switch and the pilot valve motor, a main burner arranged to be lighted by the pilot burner, a main burner valve, a motor for opening the main burner valve, and an energizing circuit for the main burner motor comprising the relay switch and the master control switch.

4. In apparatus of the class described, the combination of a pilot burner, a pilot burner valve, an electric motor for opening said valve, a main burner, a main burner valve, an electric motor for opening said main burner valve, an electric igniter for the pilot burner, a control relay having a normally open switch, an energizing circuit for said igniter which includes said relay, an energizing circuit for the pilot valve motor which includes said relay, an energizing circuit for the main valve motor which includes the relay switch, and means for deenergizing the igniter when there is flame at the pilot burner.

5. In apparatus of the class described, the combination of a pilot burner, an electric igniter for said burner, a normally closed switch, means dependent on flame at the pilot for opening said switch, a control relay having a normally open switch, an energizing circuit for the relay comprising the igniter and said switch, and means for maintaining the relay energized after the pilot flame causes the said switch to open and thus deenergize the igniter, said means comprising a shunt circuit across said energizing circuit, said shunt circuit comprising the relay switch and an electrical element having sufficient resistance as to permit a substantial part of the relay current to flow through the igniter prior to the opening of the said normally closed switch.

6. In apparatus of the class described, the combination of a pilot burner, a pilot burner valve, an electric motor for operating said valve, a normally open first switch, said motor being operative when energized to open said valve and to close said switch, an electric igniter for said burner, a normally closed second switch, means dependent on flame at the pilot for opening the said second switch, an energizing circuit for said motor comprising the igniter and the said second switch, and means for maintaining said motor energized after the pilot flame causes the second switch to open, said means comprising a shunt circuit across said second switch and igniter, said shunt circuit comprising the said first switch and a resistor having sufficient resistance as to permit a substantial part of the motor current to flow through the igniter prior to the opening of said second switch.

7. In apparatus of the class described, the combination of a main burner and a master control switch for controlling its operation, a main burner valve, a motor for opening said valve, a pilot burner for lighting the main burner, a pilot burner valve, a motor for opening the pilot burner valve, an electric igniter for lighting the pilot, first and second pilot switches, heat responsive means associated with the pilot burner for operating said switches, a relay having a normally open relay switch, an energizing circuit for the main valve motor including the master control switch and the relay switch and the first pilot switch, said first pilot switch being closed when said heat responsive means is hot, means for closing the relay switch whereby to place said main valve motor under control of the first pilot switch comprising an energizing circuit for the relay, said last named circuit including the igniter and the master control switch and the second pilot switch, the second pilot switch being closed when said heat responsive means is cold whereby the relay can be initially energized only after the pilot has been out for a period of time, the said pilot valve motor and said relay switch serving to provide a holding circuit for said relay.

8. In apparatus of the class described, the combination of a main burner and a master control switch for controlling its operation, a main burner valve, a motor for opening said valve, a pilot burner for lighting the main burner, an electric igniter for lighting the pilot, a normally closed switch, means responsive to heat from the pilot for opening said switch when the pilot is burning, a relay having a normally open relay switch, an energizing circuit for the main valve motor including the master control switch and the relay switch, means for closing the relay switch whereby to place said main valve motor under control of said master control switch, said means comprising an energizing circuit for the relay including the master control switch and said normally closed switch whereby the relay can be initially energized only when said heat responsive means is cold, said igniter being in circuit with said normally closed switch whereby the igniter is deenergized after the pilot is burning, and means including the relay switch when closed for establishing a holding circuit for the relay independently of the said normally closed switch.

DON BEGGS.